3,505,382
METHOD FOR THE PREPARATION OF ARYLISOTHIOCYANATES
Antoine Theofiel Rasschaert and Gaston Jacob Benoy, Berchem, and Jan Frans van Besauw, Brasschaat, Belgium, assignors to Gevaert-Agfa N.V., Mortsel, Belgium, a Belgian company
No Drawing. Filed Dec. 27, 1966, Ser. No. 604,660
Int. Cl. C07c *161/04*
U.S. Cl. 260—454                                    4 Claims

ABSTRACT OF THE DISCLOSURE

Aryl isothiocyanates are prepared directly from the corresponding arylamine by dissolving the arylamine in an inert solvent, saturating the solution of arylamine with hydrogen chloride, and adding ammonium thiocyanate to the saturated solution. An excess of hydrogen chloride is introduced throughout the reaction time while refluxing. The process is simple and provides good yields.

---

The present invention relates to a new method for the preparation of aryl isothiocyanates.

There is an increasing interest for isothiocyanates because they are used as starting materials for the preparation of important fine chemicals of use in the pharmaceutical, phytopharmaceutical and photographic industries. In this connection there can be referred to "The Dithio-Carbamates and Related Compounds" by G. D. Thorn and R. A. Ludwig, Elsevier Publishing Company (1962) to "Organic Sulphur Compounds" by N. Kharash, vol. 1, Pergamon Press (1961) as well as to C. A. Vol. 65, 7081 (1966) according to which isothiocyanates would have an inhibitory effect against nitrification of ammonium ions by soil microbes.

It is known to synthesize isothiocyanates directly from primary amines by reaction with thiophosgene; however, this method is rendered undesirable by the toxicity, unpleasant odour, high price and unavailability of the thiophosgene and thus not at all applicable on an industrial scale.

Among the methods for the preparation of aryl isothiocyanates one of the most convenient methods of preparation of aryl isothiocyanates known up to now is the pyrolysis of arylthioureas in a suitable inert solvent. This method has been proposed by J. N. Baxter et al., J. Chem. Soc. 659 (1956).

According to the present invention, a new and very simple general one-step synthesis of aryl isothiocyanates starting from the corresponding arylamines is provided. According to the method of the invention the aryl isothiocyanates are prepared by allowing to react the corresponding arylamines in an inert solvent such as chlorobenzene, xylene and cumene with ammonium thiocyanate in the presence of an excess of hydrogen chloride.

In practice, a solution of the arylamine in an inert solvent as saturated with hydrogen chloride whereupon ammonium thiocyanate is added and the mixture is refluxed while continuing the introduction of hydrogen chloride.

The following preparations of some specific aryl isothiocyanates illustrate more particularly the method according to the present invention.

PREPARATION 1.—α-NAPHTHYL ISOTHIOCYANATE

In a reaction vessel 143 g. (1 mole) of α-naphthylamine are dissolved in 2000 ml. of dry chlorobenzene. While stirring, the solution is saturated with hydrogen chloride. The reaction proceeds exothermally and α-naphthylammonium chloride precipitates as a thick paste. As soon as hydrogen chloride escapes abundantly through the condenser, the reaction mixture is heated to its boiling temperature, and then 96 g. (1.2 mole) of ammonium thiocyanate are added. The reaction mixture is refluxed with stirring and continuous introduction of an excess of hydrogen chloride.

After some minutes the thick paste disappears, the mixture becomes clear and immediately thereafter a yellow precipitate forms. The mixture is refluxed for 6 hours and the introduction of hydrogen chloride is regulated so that a little excess of hydrogen chloride escapes continuously through the condenser. After cooling to room temperature, the precipitate formed is filtered by suction and washed with a little chlorobenzene. The filtrate is evaporated and the residue becomes solid upon cooling. The colourless crystals melt at 54° C. Yield: 177 g. (96%).

PREPARATION 2.—o-METHOXYPHENYL ISOTHIOCYANATE

In a reaction vessel 8000 ml. of chlorobenzene are placed and 500 ml. are distilled off again in order to remove all moisture from the apparatus. Then 615 g. of o-anisidine are placed in the reaction vessel and the whole is saturated with hydrogen chloride. A thick suspension forms and the reaction mixture is heated to the reflux temperature whereupon 460 g. of ammonium thiocyanate are added at once. The mixture is refluxed for about 5 hours under continuous introduction of hydrogen chloride. While the anisidinium chloride disappears a yellow-greyish precipitate forms. The reaction mixture is allowed to cool and the precipitate is filtered by suction. The filtrate is evaporated and the residue is dissolved in 1500 ml. of boiling hexane. The solution is decanted and allowed to cool; the little precipitate that forms is filtered by suction. Then the hexane solution is evaporated and the residue is distilled under reduced pressure. Yield: 562 g. (68%). Boiling point: 152° C./20 mm. Hg.

In the following table a survey is given of aryl isothiocyanates prepared according to the method of the invention, without however limiting the invention thereto.

TABLE

Ar—N=C=S

| Ar | Yield | Boiling point, °C./mm. Hg | Melting point, (°C.) |
|---|---|---|---|
| Phenyl | 80 | 106/25 | |
| o-Tolyl | 50 | 108/5 | |
| p-Tolyl | 68 | 116/15 | |
| m-Tolyl | 28 | 110/8 | |
| 2,3-dimethylphenyl | 70 | 128/8 | |
| 2,5-dimethylphenyl | 11 | 122/8 | |
| 2,6-dimethylphenyl | 41 | 120/8 | |
| 3,4-dimethylphenyl | 67 | 132/8 | |
| 2,4,5-trimethylphenyl | 40 | 138/8 | |
| o-Ethylphenyl | 73 | 125/15 | |
| m-Ethylphenyl | 67 | 116/7 | |
| p-Ethylphenyl | 78 | 150/25 | |
| o-Methoxyphenyl | 63 | 149/18 | |
| m-Methoxyphenyl | 73 | 134/10 | |
| p-Methoxyphenyl | 19 | 142/8 | |
| p-t-Butylphenyl | 61 | 155/18 | 30 |
| o-Trifluoromethyl-phenyl | 53 | 96/10 | |
| m-Trifluoromethyl-phenyl | 19 | 83/5 | |
| o-Chlorophenyl | 14 | 120/8 | |
| m-Chlorophenyl | 63 | 120/8 | |
| p-Chlorophenyl | 48 | | 45 |
| m-Bromophenyl | 50 | 131/8 | |
| p-Bromophenyl | 28 | | 60 |
| 3,4-dichlorophenyl | 37 | 148/10 | |
| 2,4-dichlorophenyl | 51 | | 30 |
| 2-methyl-6-chloro-phenyl | 18 | 120/7 | |
| 2-methyl-3-chloro-phenyl | 50 | 145/15 | |
| 2-methyl-5-chloro-phenyl | 42 | 147/15 | |
| 4-methyl-3-chlorophenyl | 67 | 130/7 | |
| 2-methyl-4-bromo-phenyl | 34 | | 45 |
| 4-methyl-2-bromo-phenyl | 23 | 162/12 | |
| 3,5-dimethoxycarbonyl-phenyl | 55 | | 115 |
| o-Biphenylyl | 75 | 180/8 | |
| p-Biphenylyl | 31 | | 65 |
| m-Nitro-phenyl | 4 | | 58 |
| m-Sulfonfluoro-phenyl | 0 | | |
| α-Naphthyl | 96 | | 54 |
| β-Naphthyl | 92 | | 59 |
| 2-chrysenyl | 31 | | 175 |

From this table it appears that the reaction can be widely applied to all kinds of arylamines, except, however, to arylamines carrying very strongly electron withdrawing substituents such as nitro groups and fluorosulphonyl groups. It should be noted that even though in some cases relatively low yields are obtained these yields could be increased by optimizing the reaction conditions; in any event the method of the invention is time-saving and still advantageous as compared with syntheses proceeding in various reaction steps e.g. the method of Baxter et al. where the arylthioureas are prepared from the corresponding arylamines through the intermediary of an aryl isothiocyanate. Moreover, the method according to the invention can be carried out very esaily even on industrial scale without giving rise to technological difficulties.

We claim:

1. A process of preparing aryl isothiocyanates comprising refluxing the corresponding mono-aryl primary amine, ammonium thiocyanate, and hydrogen chloride in a solvent inert with respect to said arylamine and said aryl isothiocyanate while adding an excess of hydrogen chloride throughout the refluxing and recovering said aryl isothiocyanate.

2. The process of claim 1 wherein said amine is dissolved in said solvent, said solution saturated with hydrogen chloride, and ammonium thiocyanate added to said saturated solution.

3. The process of claim 2 wherein the amine is selected from the group consisting of chlorobenzene, xylene, and cumene.

4. The process of claim 2 wherein the amine is selected from the group consisting of o-anisidine, α-naphthylamine, phenylamine, o-tolylamine, p-tolylamine, m-tolylamine, 2,3-dimethylphenylamine, 2,5-dimethylphenylamine, 2,6-dimethylphenylamine, 3,4-dimethylphenylamine, 2,4,5-trimethylphenylamine, o-ethylphenylamine, m-ethylphenylamine, p-ethylphenylamine, o-methoxyphenylamine, m-methoxyphenylamine, p-methoxyphenylamine, p-t-butylphenylamine, o-trifluoromethyl-phenylamine, m-trifluoromethyl-phenylamine, o-chlorophenylamine, m-chlorophenylamine, p-chlorophenylamine, m-bromophenylamine, p-bromophenylamine, 3,4-dichlorophenylamine, 2,4-dichlorophenylamine, 2-methyl-6-chloro-phenylamine, 2-methyl-3-chloro-phenylamine, 2-methyl-5-chloro-phenylamine, 4-methyl-3-chlorophenylamine, 4-methyl-3-chlorophenylamine, 2-methyl-4-bromo-phenylamine, 4-methyl-2-bromo-phenylamine, 3,5-dimethoxycarbonylphenylamine, o-bipenylylamine, p-biphenylylamine, m-nitrophenylamine, m-sulfofluoro-phenylamine, β-naphthylamine, and 2-chrysenylamine.

References Cited

UNITED STATES PATENTS 2,086,822  7/1937  Schubert et al. __ 260—552 XR
2,899,426  8/1959  Bloom _____ 260—552 XR

OTHER REFERENCES

Baxter et al, J. Chem. Soc., 659–665 (1956).

ELBERIL ROBERTS, Primary Examiner

G. HOLLRAH, Assistant Examiner

U.S. Cl. X.R.

260—578

PO-1050
(5/69)

UNITED STATES PATENT OFFICE
CERTIFICATE OF CORRECTION

Patent No. 3,505,382      Dated April 7, 1970

Inventor(s) Antoine Theofiel Rasschaert et al

It is certified that error appears in the above-identified patent and that said Letters Patent are hereby corrected as shown below:

Column 3, line 30, delete "Sulfonfluoro-phenyl" and insert --Sulfofluoro-phenyl --.

Column 4, line 12, delete "amine" and insert -- solvent --.

Column 4, line 30, delete "yl-5-chloro-phenylamine, 4-methyl-3-chlorophenylaminn".

November 3, 1970

(SEAL)
Attest:

Edward M. Fletcher, Jr.
Attesting Officer

WILLIAM E. SCHUYLER, JR.
Commissioner of Patents